US012671908B2

(12) United States Patent
Chen et al.

(10) Patent No.: US 12,671,908 B2
(45) Date of Patent: Jun. 30, 2026

(54) EXPOSURE CONTROL METHOD APPLICABLE TO EXPOSURE FUSION

(71) Applicant: REALTEK SEMICONDUCTOR CORPORATION, Hsinchu (TW)

(72) Inventors: Xiao-Yu Chen, Suzhou (CN); Gang Shen, Suzhou (CN); Yang Lu, Suzhou (CN); Dong-Yu He, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 61 days.

(21) Appl. No.: 18/943,025

(22) Filed: Nov. 11, 2024

(65) Prior Publication Data

US 2025/0168516 A1     May 22, 2025

(30) Foreign Application Priority Data

Nov. 16, 2023     (CN) .......................... 202311532182.2

(51) Int. Cl.
*H04N 23/73* (2023.01)
*H04N 25/585* (2023.01)
(52) U.S. Cl.
CPC ........... *H04N 23/73* (2023.01); *H04N 25/585* (2023.01)
(58) Field of Classification Search
CPC ...... H04N 23/73; H04N 25/585; H04N 23/71; H04N 23/741; H04N 25/583; H04N 25/587; H04N 25/53; H04N 25/46; H04N 25/58
See application file for complete search history.

(56) References Cited

U.S. PATENT DOCUMENTS

| | | | | | |
|---|---|---|---|---|---|
| 6,879,731 B2 * | 4/2005 | Kang | ........................ | H04N 5/77 | |
| | | | | 386/E5.069 | |
| 8,040,411 B2 * | 10/2011 | Nakajima | ............ | H04N 25/589 | |
| | | | | 348/254 | |
| 8,189,069 B2 * | 5/2012 | Ogawa | ................. | H04N 23/951 | |
| | | | | 348/229.1 | |
| 8,798,395 B2 * | 8/2014 | Jo | ....................... | H04N 23/6811 | |
| | | | | 382/284 | |
| 9,247,153 B2 * | 1/2016 | Umezu | ................. | H04N 23/682 | |
| 9,380,218 B2 * | 6/2016 | Chen | ..................... | G06T 7/0002 | |
| 10,728,473 B2 * | 7/2020 | Zhao | .................... | H04N 23/741 | |
| 11,258,957 B2 * | 2/2022 | McElvain | .............. | H04N 23/73 | |
| 2020/0045219 A1 * | 2/2020 | Zhang | .................. | H04N 23/741 | |

* cited by examiner

*Primary Examiner* — Abdelaaziz Tissire
(74) *Attorney, Agent, or Firm* — WPAT, PC

(57) ABSTRACT

An exposure control method includes: calculating a long-exposure brightness mean value of pixels of darker (N–X) kinds of brightness among N kinds of brightness values of a long exposure image, wherein a total number of pixels of brightest X kinds of brightness values among the N kinds of brightness values is a long-exposure bright pixel number; when the long-exposure brightness mean value doesn't approximate to a long-exposure target brightness mean value, adjusting exposure setting for generating/modifying the long exposure image to make the two brightness mean values be similar/equal; determining brightest K pixels of a short exposure image, wherein the K is equal to the long-exposure bright pixel number; calculating a short-exposure brightness mean value; and when the short-exposure brightness mean value doesn't approximate to a short-exposure target brightness mean value, adjusting exposure setting for generating/modifying the short exposure image to make the two brightness mean values be similar/equal.

12 Claims, 7 Drawing Sheets

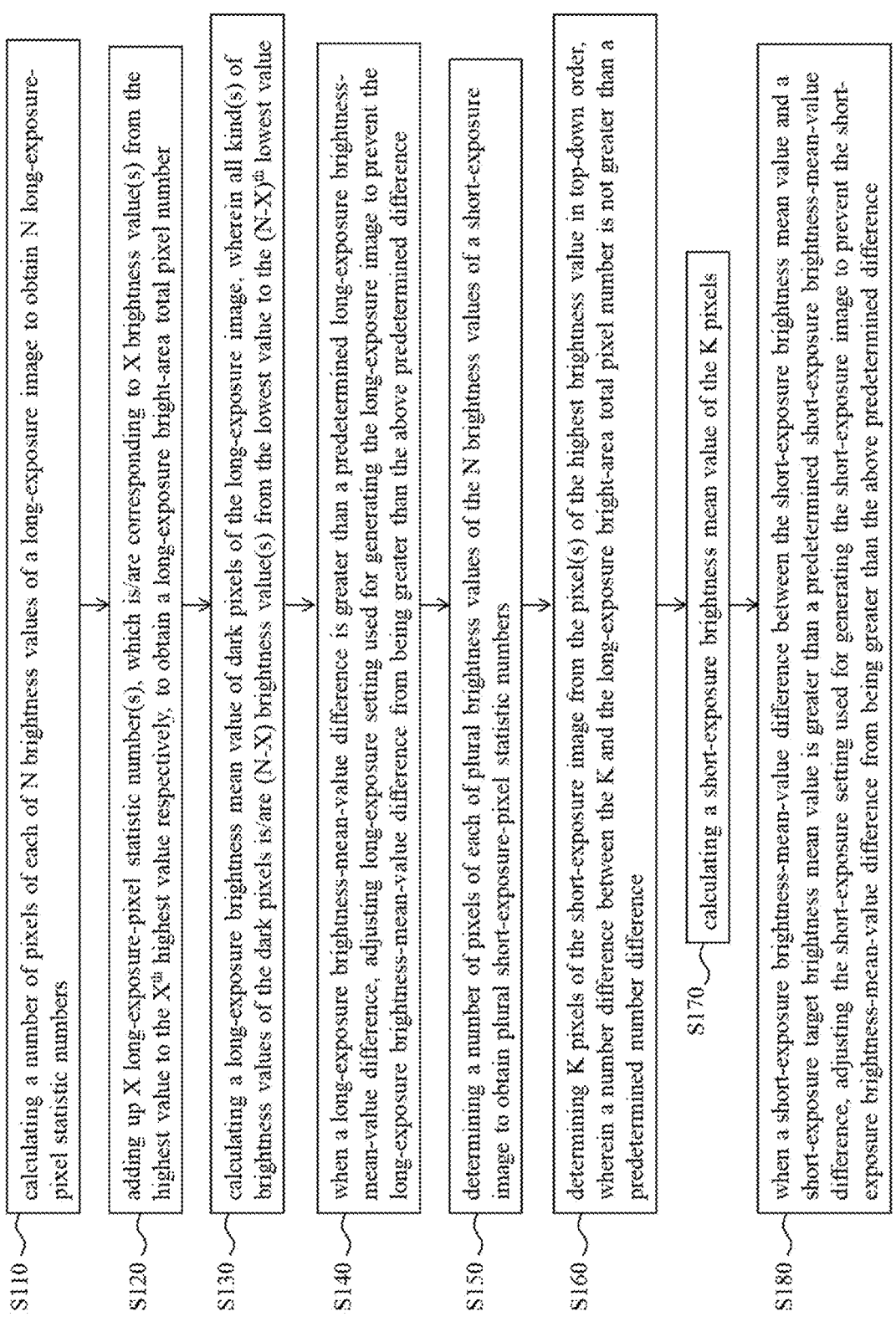

S110 calculating a number of pixels of each of N brightness values of a long-exposure image to obtain N long-exposure-pixel statistic numbers S120 adding up X long-exposure-pixel statistic number(s), which is/are corresponding to X brightness value(s) from the highest value to the X$^{th}$ highest value respectively, to obtain a long-exposure bright-area total pixel number S130 calculating a long-exposure brightness mean value of dark pixels of the long-exposure image, wherein all kind(s) of brightness values of the dark pixels is/are (N-X) brightness value(s) from the lowest value to the (N-X)$^{th}$ lowest value S140 when a long-exposure brightness-mean-value difference is greater than a predetermined long-exposure brightness-mean-value difference, adjusting long-exposure setting used for generating the long-exposure image to prevent the long-exposure brightness-mean-value difference from being greater than the above predetermined difference S150 determining a number of pixels of each of plural brightness values of the N brightness values of a short-exposure image to obtain plural short-exposure-pixel statistic numbers S160 determining K pixels of the short-exposure image from the pixel(s) of the highest brightness value in top-down order, wherein a number difference between the K and the long-exposure bright-area total pixel number is not greater than a predetermined number difference S170 calculating a short-exposure brightness mean value of the K pixels S180 when a short-exposure brightness-mean-value difference between the short-exposure brightness mean value and a short-exposure target brightness mean value is greater than a predetermined short-exposure brightness-mean-value difference, adjusting the short-exposure setting used for generating the short-exposure image to prevent the short-exposure brightness-mean-value difference from being greater than the above predetermined difference

Fig. 1

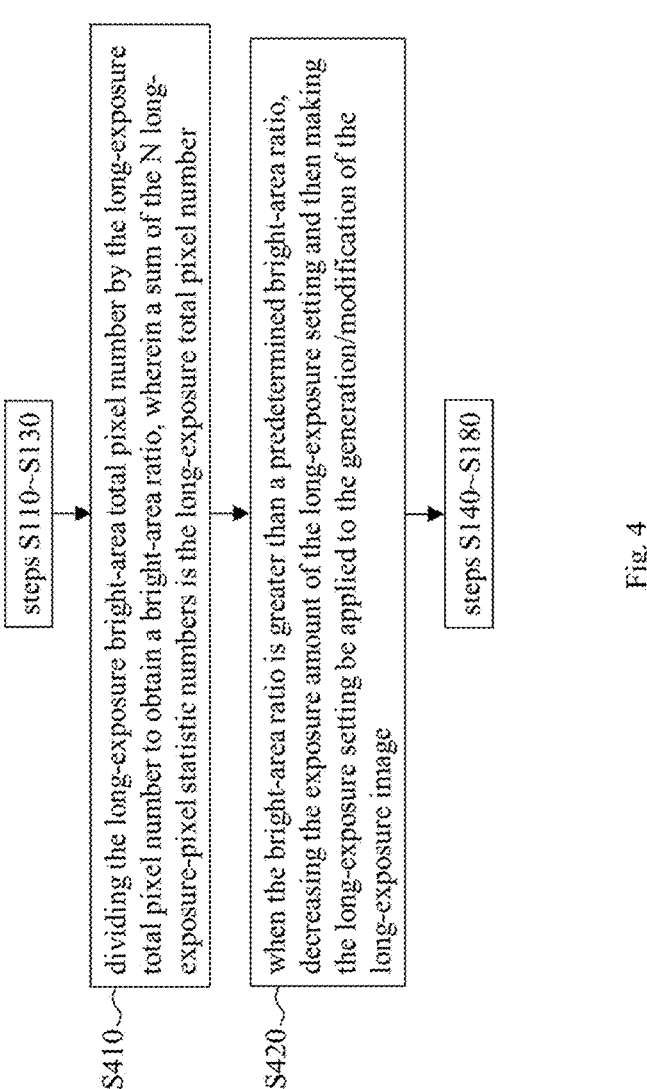

steps S110~S130

S410 — dividing the long-exposure bright-area total pixel number by the long-exposure total pixel number to obtain a bright-area ratio, wherein a sum of the N long-exposure-pixel statistic numbers is the long-exposure total pixel number S420 — when the bright-area ratio is greater than a predetermined bright-area ratio, decreasing the exposure amount of the long-exposure setting and then making the long-exposure setting be applied to the generation/modification of the long-exposure image steps S140~S180

Fig. 4

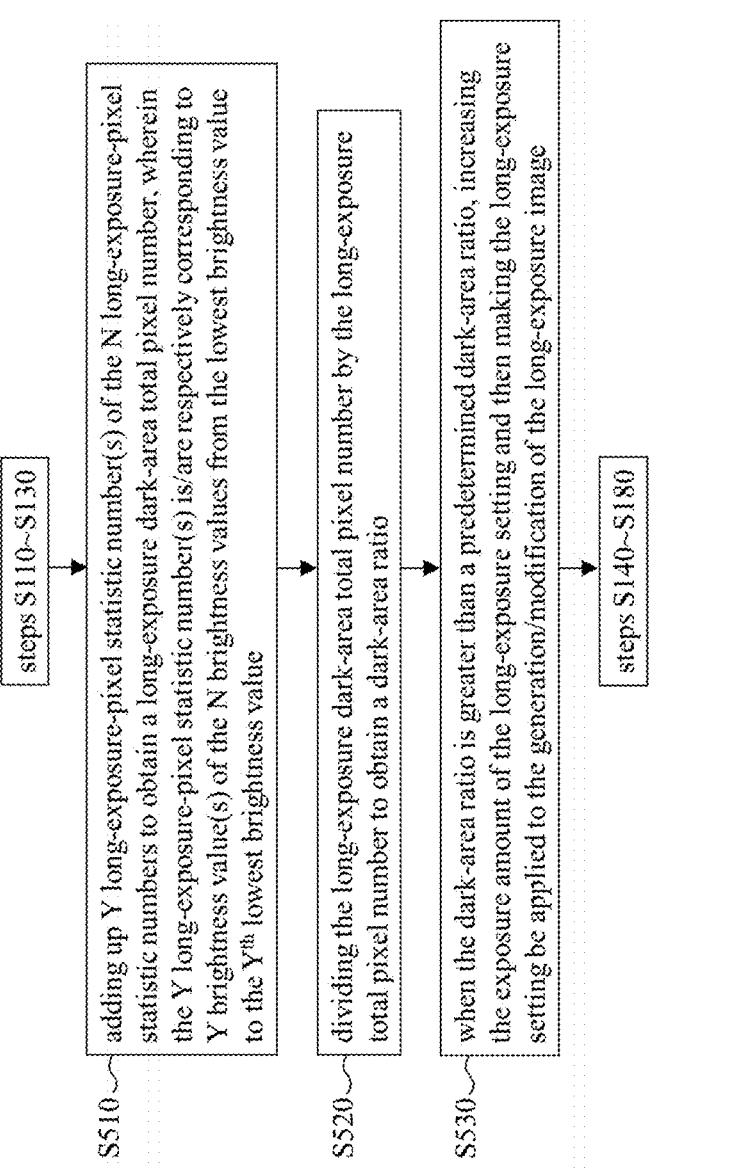

steps S110~S130

S510 — adding up Y long-exposure-pixel statistic number(s) of the N long-exposure-pixel statistic numbers to obtain a long-exposure dark-area total pixel number, wherein the Y long-exposure-pixel statistic number(s) is/are respectively corresponding to Y brightness value(s) of the N brightness values from the lowest brightness value to the $Y^{th}$ lowest brightness value S520 — dividing the long-exposure dark-area total pixel number by the long-exposure total pixel number to obtain a dark-area ratio S530 — when the dark-area ratio is greater than a predetermined dark-area ratio, increasing the exposure amount of the long-exposure setting and then making the long-exposure setting be applied to the generation/modification of the long-exposure image steps S140~S180

Fig. 5 steps S110~S130

S610 — when the exposure amount of the long-exposure setting is adjusted by a long-exposure adjustment amount, adjusting the exposure amount of the short-exposure setting by a short-exposure adjustment amount correspondingly steps S140~S180

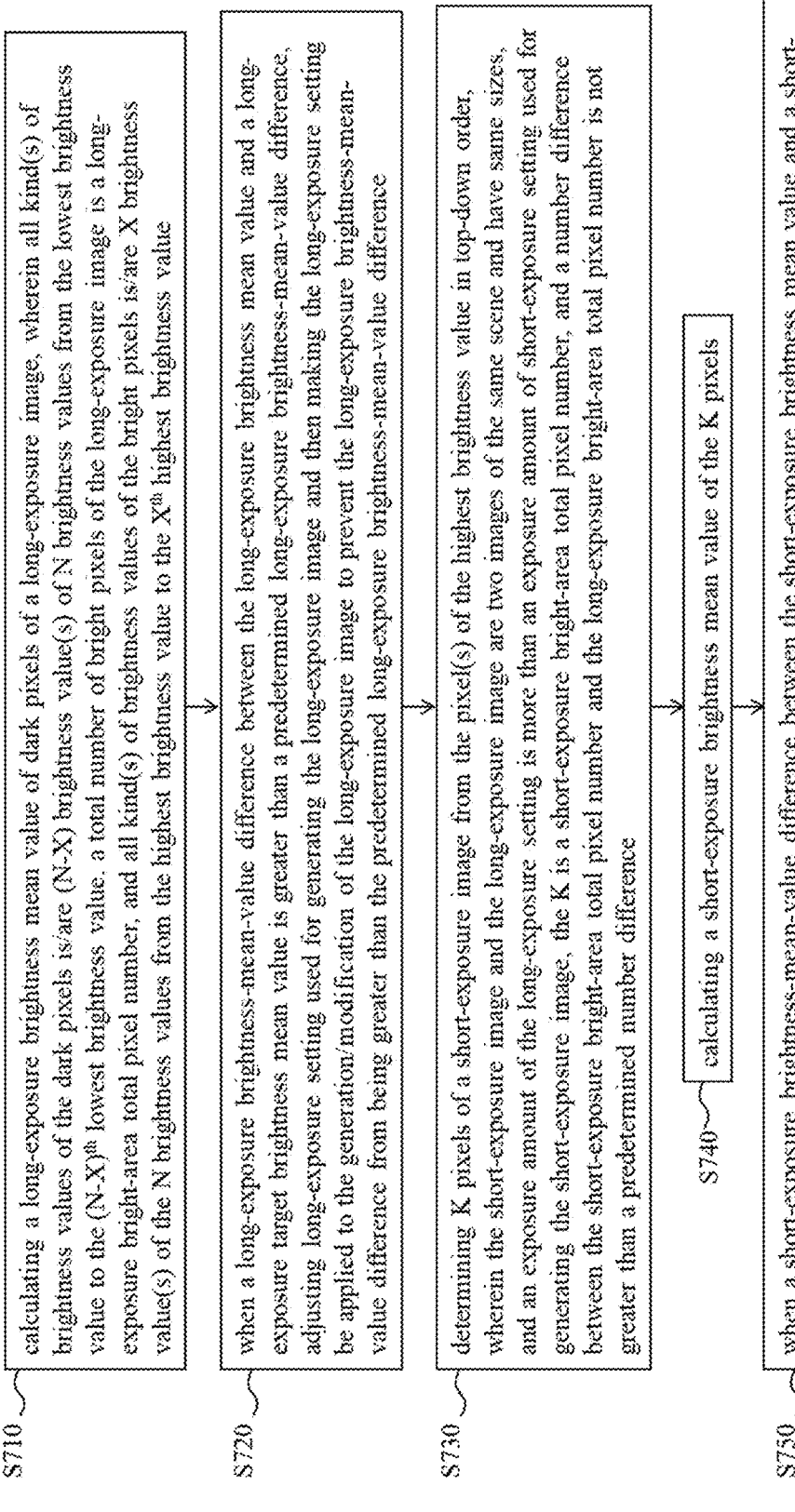

S710 — calculating a long-exposure brightness mean value of dark pixels of a long-exposure image, wherein all kind(s) of brightness values of the dark pixels is/are (N-X) brightness value(s) of N brightness values from the lowest brightness value to the (N-X)ᵗʰ lowest brightness value, a total number of bright pixels of the long-exposure image is a long-exposure bright-area total pixel number, and all kind(s) of brightness values of the bright pixels is/are X brightness value(s) of the N brightness values from the highest brightness value to the Xᵗʰ highest brightness value S720 — when a long-exposure brightness-mean-value difference between the long-exposure brightness mean value and a long-exposure target brightness mean value is greater than a predetermined long-exposure brightness-mean-value difference, adjusting long-exposure setting used for generating the long-exposure image and then making the long-exposure setting be applied to the generation/modification of the long-exposure image to prevent the long-exposure brightness-mean-value difference from being greater than the predetermined long-exposure brightness-mean-value difference S730 — determining K pixels of a short-exposure image from the pixel(s) of the highest brightness value in top-down order, wherein the short-exposure image and the long-exposure image are two images of the same scene and have same sizes, and an exposure amount of the long-exposure setting is more than an exposure amount of short-exposure setting used for generating the short-exposure image, the K is a short-exposure bright-area total pixel number, and a number difference between the short-exposure bright-area total pixel number and the long-exposure bright-area total pixel number is not greater than a predetermined number difference S740 — calculating a short-exposure brightness mean value of the K pixels S750 — when a short-exposure brightness-mean-value difference between the short-exposure brightness mean value and a short-exposure target brightness mean value is greater than a predetermined short-exposure brightness-mean-value difference, adjusting the short-exposure setting and then making the short-exposure setting be applied to the generation/modification of the short-exposure image to prevent the short-exposure brightness-mean-value difference from being greater than the predetermined short-exposure brightness-mean-value difference

Fig. 7

EXPOSURE CONTROL METHOD APPLICABLE TO EXPOSURE FUSION

BACKGROUND OF THE INVENTION

1. Field of the Invention

The present disclosure relates to an exposure control method, especially to an exposure control method applicable to exposure fusion.

2. Description of Related Art

Most consumer cameras are equipped with image sensors of narrow dynamic range because image sensors of wide dynamic range are expensive. In order to take pictures of high-contrast scenes, an image sensor of a consumer camera may use the technique of exposure fusion which merges a plurality of images of different exposures into a high dynamic range (HDR) image. In order to achieve a better result, a general exposure fusion process may execute multiple adjustments in exposure time and execute a post process to modify image effects; however, this general exposure fusion process takes a lot of time and is complicated and cost-ineffective. For some photo shooting situations (e.g., making a video), the general exposure fusion process can hardly meet requirements. In consideration of the above, this technical field looks forward to a simple and fast exposure control method.

SUMMARY OF THE INVENTION

An object of the present disclosure is to provide an exposure control method applicable to exposure fusion and thereby prevents the problems of the prior arts.

An embodiment of the exposure control method of the present disclosure includes long-exposure adjustment steps and short-exposure adjustment steps. The long-exposure adjustment steps are used to ensure that the details of a dark area and a non-overexposure area of a long-exposure image can be reserved appropriately. The short-exposure adjustment steps are used to ensure that the details of a bright area of a short-exposure image can be reserved appropriately.

Regarding the above-mentioned embodiment, the long-exposure adjustment steps includes: calculating a number of pixels of each brightness value of N brightness values (e.g., all brightness values of the long-exposure image, or five brightness intervals corresponding to black, shadow, normal brightness, high brightness, and white (or over-exposure brightness) respectively) of the long-exposure image to obtain N long-exposure-pixel statistic numbers, wherein the N long-exposure-pixel statistic numbers are corresponding to the N brightness values respectively, any two of the N brightness values are different, and the N is an integer equal to or greater than five; adding up X long-exposure-pixel statistic number(s) of the N long-exposure-pixel statistic numbers to obtain a long-exposure bright-area total pixel number, wherein the X long-exposure-pixel statistic number(s) is/are respectively corresponding to X brightness value(s) of the N brightness values from a highest brightness value of the N brightness values to an $X^{th}$ highest brightness value of the N brightness values, and the X is a positive integer smaller than the N; calculating a long-exposure brightness mean value of dark pixels of the long-exposure image, wherein all kind(s) of brightness values of the dark pixels is/are (N–X) brightness value(s) of the N brightness values from a lowest brightness value of the N brightness values to an $(N–X)^{th}$ lowest brightness value of the N brightness values; and when a long-exposure brightness-mean-value difference between the long-exposure brightness mean value and a long-exposure target brightness mean value is greater than a predetermined long-exposure brightness-mean-value difference, adjusting long-exposure setting that is used for generating the long-exposure image and then making the long-exposure setting be applied to the generation/modification of the long-exposure image to prevent the long-exposure brightness-mean-value difference from being greater than the predetermined long-exposure brightness-mean-value difference.

Regarding the aforementioned embodiment, the short-exposure adjustment steps includes: determining a number of pixels of each brightness value of plural brightness values of the N brightness values of the short-exposure image to obtain plural short-exposure-pixel statistic numbers, wherein the plural short-exposure-pixel statistic numbers are corresponding to the plural brightness values respectively, the short-exposure image and the long-exposure image are two images of the same scene and have the same sizes, and an exposure amount of the long-exposure setting is more than an exposure amount of short-exposure setting that is used for generating the short-exposure image; determining K pixels of the short-exposure image from the pixel(s) of the highest brightness value in top-down brightness order, wherein the K is a short-exposure bright-area total pixel number, and a number difference between the short-exposure bright-area total pixel number and the long-exposure bright-area total pixel number is not greater than a predetermined number difference; calculating a short-exposure brightness mean value of the K pixels; and when a short-exposure brightness-mean-value difference between the short-exposure brightness mean value and a short-exposure target brightness mean value is greater than a predetermined short-exposure brightness-mean-value difference, adjusting the short-exposure setting and then making the short-exposure setting be applied to the generation/modification of the short-exposure image to prevent the short-exposure brightness-mean-value difference from being greater than the predetermined short-exposure brightness-mean-value difference.

Another embodiment of the exposure control method of the present disclosure includes long-exposure adjustment steps and short-exposure steps. The long-exposure adjustment steps includes: calculating a long-exposure brightness mean value of dark pixels of a long-exposure image, wherein all kind(s) of brightness values of the dark pixels is/are (N–X) brightness value(s) of N brightness values of the long-exposure image from a lowest brightness value of the N brightness values to an $(N–X)^{th}$ lowest brightness value of the N brightness values, wherein a total number of bright pixels of the long-exposure image is a long-exposure bright-area total pixel number, all kind(s) of brightness values of the bright pixels is/are X brightness value(s) of the N brightness values from a highest brightness value of the N brightness values to an $X^{th}$ highest brightness value of the N brightness values, any two of the N brightness values are different, the N is an integer equal to or greater than five, and the X is a positive integer smaller than the N; and when a long-exposure brightness-mean-value difference between the long-exposure brightness mean value and a long-exposure target brightness mean value is greater than a predetermined long-exposure brightness-mean-value difference, adjusting long-exposure setting that is used for generating the long-exposure image and then making the long-exposure setting be applied to the generation/modification of the long-exposure image to prevent the long-exposure brightness-mean-value difference from being greater than the predetermined long-exposure brightness-mean-value difference. The short-exposure adjustment steps includes: determining K pixels of a short-exposure image from the pixel(s) of the highest brightness value in top-down brightness order, wherein the short-exposure image and the long-exposure image are two images of the same scene and have the same sizes, and an exposure amount of the long-exposure setting is more than an exposure amount of short-exposure setting that is used for generating the short-exposure image, the K is a short-exposure bright-area total pixel number, and a number difference between the short-exposure bright-area total pixel number and the long-exposure bright-area total pixel number is not greater than a predetermined number difference; calculating a short-exposure brightness mean value of the K pixels; and when a short-exposure brightness-mean-value difference between the short-exposure brightness mean value and a short-exposure target brightness mean value is greater than a predetermined short-exposure brightness-mean-value difference, adjusting the short-exposure setting and then making the short-exposure setting be applied to the generation/modification of the short-exposure image to prevent the short-exposure brightness-mean-value difference from being greater than the predetermined short-exposure brightness-mean-value difference.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 1 shows an embodiment of the exposure control method of the present disclosure.

FIG. 4 shows another embodiment of the exposure control method of the present disclosure.

FIG. 5 shows yet another embodiment of the exposure control method of the present disclosure.

FIG. 7 shows yet another embodiment of the exposure control method of the present disclosure.

DETAILED DESCRIPTION OF THE PREFERRED EMBODIMENTS

The present specification discloses an exposure control method applicable to exposure fusion. The method can control the exposure setting used for generating/modifying a long-exposure image and the exposure setting used for generating/modifying a short-exposure image in a simple and fast way. The long-exposure image and the short-exposure image are two images of the same scene and have the same sizes (i.e., the same image widths and heights). In addition, the exposure for generating the long-exposure image is more than the exposure for generating the short-exposure image.

FIG. 1 shows an embodiment of the exposure control method of the present disclosure. The embodiment of FIG. 1 can be applied to a camera operation that is used for controlling the amount of long exposure and the amount of short exposure before the adjustments in exposure fusion. The embodiment of FIG. 1 includes long-exposure adjustment steps and short-exposure adjustment steps. The long-exposure adjustment steps are used to ensure that the details of a dark area and a non-overexposure area of a long-exposure image can be reserved appropriately. The short-exposure adjustment steps are used to ensure that the details of a bright area of a short-exposure image can be reserved appropriately. These steps are described in detail in the following paragraphs.

Referring to FIG. 1, the long-exposure adjustment steps are used to adjust/modify the exposure setting that is for generating/modifying a long-exposure image, and the long-exposure adjustment steps include the following steps:

S110: calculating a number of pixels of each of N brightness values of a long-exposure image to obtain N long-exposure-pixel statistic numbers, wherein the N long-exposure-pixel statistic numbers are corresponding to the N brightness values respectively, any two of the N brightness values are different, and the N is an integer equal to or greater than five.

Figure 2:
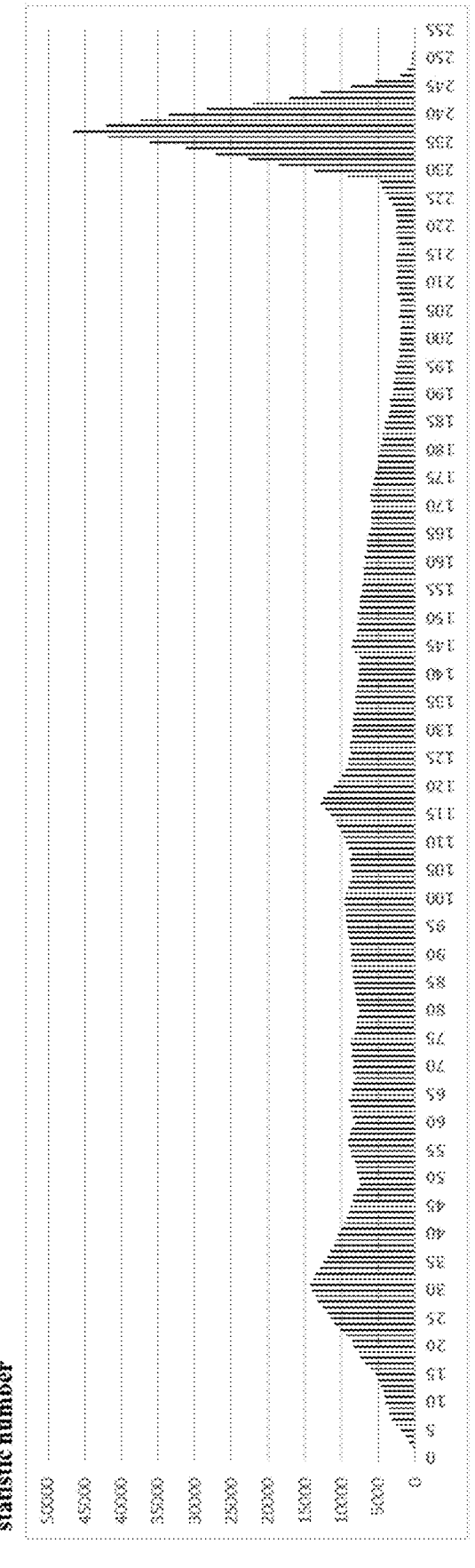
FIG. 2 shows a histogram of the N long-exposure-pixel statistic numbers.

In an exemplary implementation, the width and the height of the long-exposure image are 1920 pixels and 1080 pixels respectively, the N is 256, the N brightness values are from 0 to 255, and the histogram of the N long-exposure-pixel statistic numbers is illustrated with FIG. 2 in which the horizontal axis represents brightness values and the vertical axis represents long-exposure-pixel statistic numbers. Each long-exposure-pixel statistic number is the number of total pixels of its corresponding brightness value.

It is noted that the above exemplary implementation is for better understanding without any intention to limit the present invention to the exemplary implementation. In another exemplary implementation, the N brightness values can be N kinds of brightness intervals (e.g., black, shadow, normal brightness, high brightness, and white (or over-exposure brightness)), and each of the N kinds of brightness intervals includes consecutive brightness values of a predetermined brightness interval; for example, provided the N is 5, the N kinds of brightness intervals are a first brightness interval (e.g., the brightness interval of FIG. 2 from the brightness value "0" to the brightness value "50"), a second brightness interval (e.g., the brightness interval of FIG. 2 from the brightness value "51" to the brightness value "101"), a third brightness interval (e.g., the brightness interval of FIG. 2 from the brightness value "102" to the brightness value "152"), a fourth brightness interval (e.g., the brightness interval of FIG. 2 from the brightness value "153" to the brightness value "203"), and a fifth brightness interval (e.g., the brightness interval of FIG. 2 from the brightness value "204" to the brightness value "255"). The N long-exposure-pixel statistic numbers can be derived according to the above condition; to be more specific, each statistic number is the number of total pixels of its corresponding brightness interval.

S120: adding up X long-exposure-pixel statistic number(s) of the N long-exposure-pixel statistic numbers to obtain a long-exposure bright-area total pixel number, wherein the X long-exposure-pixel statistic number(s) is/are respectively corresponding to X brightness value(s) of the N brightness values from a highest brightness value of the N brightness values to an $X^{th}$ highest brightness value of the N brightness values, and the X is a positive integer smaller than the N.

Referring to FIG. 2, in an exemplary implementation: the X is 4, and X brightness value(s) are 4 consecutive brightness values from 252 to 255, the X long-exposure-pixel statistic number(s) are 4 statistic numbers 183, 179, 3, 1 corresponding to the 4 brightness values respectively (which can be understood as: ascertaining the number of pixels of each of the four brightness values), and the long-exposure bright area total pixel number amounts to 183+179+3+1=366.

It is noted that the X can be determined according to implementation needs.

It is also noted that the implementation of the present invention is not limited to the above exemplary implementation. In another exemplary implementation, the X brightness value(s) can be X kinds of brightness intervals (e.g., the aforementioned fourth brightness interval and the fifth brightness interval when X=2), each of the X kinds of brightness intervals includes consecutive brightness values of a predetermined brightness interval, and the X long-exposure-pixel statistic numbers are the numbers of pixels of the X kinds of brightness intervals respectively (which can be understood as: ascertaining the number of pixels of each of the X kinds of brightness intervals).

S130: calculating a long-exposure brightness mean value of dark pixels of the long-exposure image, wherein all kind(s) of brightness values of the dark pixels is/are (N–X) brightness value(s) of the N brightness values from a lowest brightness value of the N brightness values to an $(N-X)^{th}$ lowest brightness value of the N brightness values.

Referring to FIG. 2, in an exemplary implementation: the X is four, the (N–X) brightness value(s) are 252 consecutive brightness values from 0 to 251, the (N–X) long-exposure-pixel statistic number(s) are 252 statistic numbers (i.e., a first number of pixels of the brightness value "0", a second number of pixels of the brightness value "1", . . . , and a $252^{th}$ number of pixels of the brightness value "251") corresponding to the 252 brightness values respectively, and the step of calculating the long-exposure brightness mean value includes: multiplying the 252 brightness values by the 252 long-exposure-pixel statistic numbers respectively to obtain 252 products (i.e., multiplying the brightness value "0" by the first number, multiplying the brightness value "1" by the second number, . . . , and multiplying the brightness value "251" by the $252^{th}$ number) and then adding up all products to obtain a total product; and then dividing the total product by a sum of the 252 long-exposure-pixel statistic numbers to obtain the long-exposure brightness mean value.

It is noted that the implementation of the present invention is not limited to the above exemplary implementation. In another exemplary implementation, the (N–X) brightness value(s) can be (N–X) kind(s) of brightness intervals, each of the (N–X) kind(s) of brightness intervals includes consecutive brightness values of a predetermined brightness interval (e.g., the aforementioned first brightness interval, second brightness interval, and the third brightness interval), the (N–X) long-exposure-pixel statistic number(s) is/are the number(s) of pixels in the (N–X) kind(s) of brightness intervals respectively, and the step of calculating the long-exposure brightness mean value includes: multiplying (N–X) calculation value(s) (e.g., each calculation value is the average of brightness values of one brightness interval) of the (N–X) kind(s) of brightness intervals by the (N–X) long-exposure-pixel statistic number(s) respectively and thereby obtaining (N–X) product(s); adding up all the (N–X) product(s) to obtain a total product; and then dividing the total product by a sum of the (N–X) long-exposure-pixel statistic number(s) to obtain the long-exposure brightness mean value.

S140: when a long-exposure brightness-mean-value difference between the long-exposure brightness mean value and a long-exposure target brightness mean value is greater than a predetermined long-exposure brightness-mean-value difference, adjusting long-exposure setting used for generating the long-exposure image and then making the long-exposure setting be applied to the generation/modification of the long-exposure image to prevent the long-exposure brightness-mean-value difference from being greater than the predetermined long-exposure brightness-mean-value difference.

Referring to FIG. 2, in an exemplary implementation: the long-exposure brightness mean value is 130, the long-exposure target brightness mean value is 100, the difference between the above-mentioned two mean values is |130–100|=30, and the predetermined long-exposure brightness-mean-value difference is 0; and since 30>0 and 130>100, which implies that the long-exposure image is brighter than what we expected, the step S140 decreases an exposure amount of the long-exposure setting. Referring to FIG. 2, in an exemplary implementation: the long-exposure brightness mean value is 30, the long-exposure target brightness mean value is 50, the difference between the above-mentioned two mean values is |30–50|=20, and the predetermined long-exposure brightness-mean-value difference is 0; and since 20>0 and 30<50, which implies that the long-exposure image is darker than what we expected, the step S140 increases an exposure amount of the long-exposure setting. It is noted that: the long-exposure target brightness mean value can be determined according to implementation needs (e.g., according to the scenes to be photographed); and the predetermined long-exposure brightness-mean-value difference is a predetermined value or zero, and can be determined according to implementation needs.

In an exemplary implementation, the step of adjusting the exposure amount of the long-exposure setting used for generating/modifying the long-exposure image includes: adjusting at least one parameter (e.g., at least one of ISO, aperture, shutter speed, and exposure value (EV)) for generating/modifying the long-exposure image.

Referring to FIG. 1, the short-exposure adjustment steps are used to adjust the short-exposure setting that is for generating/modifying a short-exposure image, and include the following steps:

S150: determining a number of pixels of each of plural brightness values of the N brightness values of a short-exposure image to obtain plural short-exposure-pixel statistic numbers, wherein the plural short-exposure-pixel statistic numbers are corresponding to the plural brightness values respectively.

Figure 3:
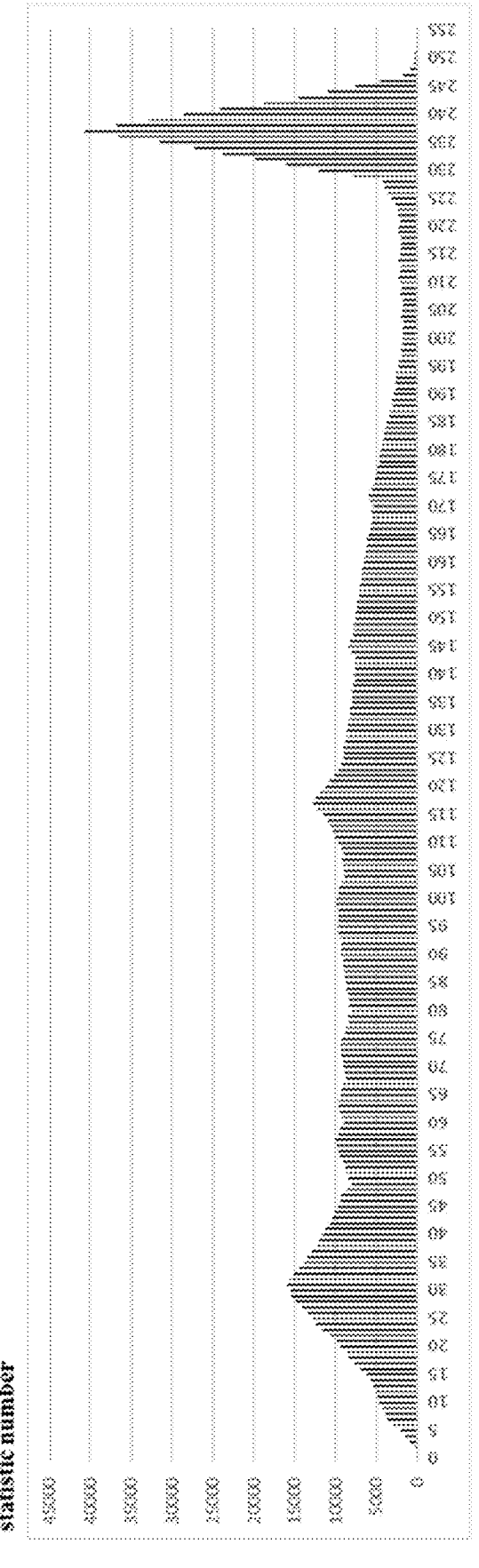
FIG. 3 shows a histogram of the N short-exposure-pixel statistic numbers.

In an exemplary implementation: the width and the height of the short-exposure image are 1920 pixels and 1080 pixels respectively, the N is 256, and N brightness values are from 0 to 255, the plural short-exposure-pixel statistic numbers are N short-exposure-pixel statistic numbers, and the histogram of the N short-exposure-pixel statistic numbers is illustrated with FIG. 3 in which the horizontal axis represents the scale of brightness values and the vertical axis represents the scale of short-exposure-pixel statistic numbers.

S160: determining K pixels of the short-exposure image from the pixel(s) of the highest brightness value in top-down brightness order, wherein the K is a short-exposure bright-area total pixel number, and a number difference between the short-exposure bright-area total pixel number and the long-exposure bright-area total pixel number is not greater than a predetermined number difference.

Referring to FIG. 3, in an exemplary implementation: the K is equal to the long-exposure bright-area total pixel number (e.g., 366), all kinds of the brightness values of the K pixels are M brightness values of the N brightness values (e.g., 5 consecutive brightness values from 255 to 251 in FIG. 3 when M=5) from the highest brightness value (e.g., 255) of the N brightness values to the $M^{th}$ highest brightness value (e.g., 251) of the N brightness values, (M−1) brightness value(s) of the M brightness values (e.g., 4 consecutive brightness values 255, 254, 253, and 252 in FIG. 3 when M=5) from the highest brightness value (e.g., 255) of the N brightness values to an $(M−1)^{th}$ brightness value (e.g., 252) of the N brightness values is/are corresponding to (M−1) short-exposure-pixel statistic number(s) (e.g., 4 statistic numbers 0, 3, 115, and 118 in FIG. 3 when M=5) of the plural short-exposure-pixel statistic numbers respectively, the lowest brightness value (e.g., 251) of the M brightness values is corresponding to a calculation statistic number which is equal to a result of subtracting the sum of the (M−1) short-exposure-pixel statistic numbers from the K (e.g., 366−(0+3+ 115+118)=130), and the M is an integer greater than one and smaller than the N.

S170: calculating a short-exposure brightness mean value of the K pixels.

In an exemplary implementation, the step S170 includes: multiplying the (M−1) brightness value(s) by the (M−1) short-exposure-pixel statistic number(s) respectively to obtain (M−1) product(s) and then adding up the (M−1) products to obtain a first product (e.g., referring to FIG. 3, multiplying the brightness values 255, 254, 253, 252 by the statistic numbers 0, 3, 115, 118 respectively and then adding up all products to obtain the first product (i.e., 255×0+254× 3+253× 115+252× 118=59593)); multiplying the lowest brightness value of the M brightness values by the calculation statistic number to obtain a second product (e.g., referring to FIG. 3, multiplying the brightness value 251 by the calculation statistic number 130 to obtain the second product 32360); and dividing the sum of the first product and the second product by the K to obtain the short-exposure brightness mean value $$\left( e.g., \frac{59593 + 32630}{366} \approx 252 \right).$$

S180: when a short-exposure brightness-mean-value difference between the short-exposure brightness mean value and a short-exposure target brightness mean value is greater than a predetermined short-exposure brightness-mean-value difference, adjusting the short-exposure setting and then making the short-exposure setting be applied to the generation/modification of the short-exposure image to prevent the short-exposure brightness-mean-value difference from being greater than the predetermined short-exposure brightness-mean-value difference.

Referring to FIG. 3, in an exemplary implementation: the short-exposure brightness mean value is 252, the short-exposure target brightness mean value is 200, the difference between the above-mentioned two mean values is |252−200|=52, and the predetermined short-exposure brightness-mean-value difference is 0; and since 52>0 and 252>200, which implies that the short-exposure image is brighter than what we expected, the step S180 decreases an exposure amount of the short-exposure setting. Referring to FIG. 3, in an exemplary implementation: the short-exposure brightness mean value is 20, the short-exposure target brightness mean value is 50, the difference between the above-mentioned two mean values is |20−50|=30, and the predetermined long-exposure brightness-mean-value difference is 0; and since 30>0 and 20<50, which implies that the short-exposure image is darker than what we expected, the step S180 increases an exposure amount of the short-exposure setting. It is noted that: the short-exposure target brightness mean value can be determined according to implementation needs (e.g., according to the scenes to be photographed); and the predetermined short-exposure brightness-mean-value difference is a predetermined value or zero, and can be determined according to implementation needs.

In an exemplary implementation, the step of adjusting the exposure amount of the short-exposure setting used for generating/modifying the short-exposure image includes: adjusting at least one parameter (e.g., at least one of ISO, aperture, shutter speed, and exposure value (EV)) for generating/modifying the short-exposure image.

It is noted that the short-exposure image can be adjusted in other ways besides the above-mentioned exemplary implementations. For example, the brightness intervals mentioned in the aforementioned adjustments of the long-exposure image can be applied to the adjustments of the short-exposure image.

FIG. 4 shows another embodiment of the exposure control method of the present disclosure. In comparison with the embodiment of FIG. 1, the long-exposure adjustment steps of the embodiment of FIG. 4 further include:

S410: dividing the long-exposure bright-area total pixel number by a long-exposure total pixel number to obtain a bright-area ratio, wherein the long-exposure total pixel number is the sum of the N long-exposure-pixel statistic numbers.

Referring to FIG. 2, in an exemplary implementation: the long-exposure bright-area total pixel number is 366, the long-exposure total pixel number is equal to the sum of all the long-exposure-pixel statistic numbers, that is to say the total pixel number of the long-exposure image (i.e., 1920×1080=2073600), and the bright-area ratio is $$\frac{366}{2073600} = 0.01765\%.$$

S420: when the bright-area ratio is greater than a predetermined bright-area ratio, decreasing the exposure amount of the long-exposure setting and then making the long-exposure setting be applied to the generation/modification of the long-exposure image.

Referring to FIG. 2, in an exemplary implementation: the bright-area ratio is 0.01765%, the predetermined bright-area ratio is 0.015%, and since 0.01765% is greater than 0.015%, which implies that the long-exposure image is brighter than what we expected, the step S420 decreases the exposure amount of the long-exposure setting used for generating the long-exposure image and then makes the long-exposure setting be applied to the generation/modification of the long-exposure image. It is noted that the predetermined bright-area ratio can be determined according to implementation needs (e.g., according to scenes to be photographed).

It is noted that the long-exposure adjustment steps can optionally include: before calculating the long-exposure brightness mean value, making the bright-area ratio be equal to or smaller than the predetermined bright-area ratio through the adjustments in the exposure amount of the long-exposure setting.

FIG. 5 shows another embodiment of the exposure control method of the present disclosure. In comparison with the embodiment of FIG. 1, the long-exposure adjustment steps of the embodiment of FIG. 5 further include:

S510: adding up Y long-exposure-pixel statistic number(s) of the N long-exposure-pixel statistic numbers to obtain a long-exposure dark-area total pixel number, wherein the Y long-exposure-pixel statistic number(s) is/are respectively corresponding to Y brightness value(s) of the N brightness values from the lowest brightness value of the N brightness values to a $Y^{th}$ lowest brightness value of the N brightness values, and the Y is a positive integer smaller than the N.

Referring to FIG. 2, in an exemplary implementation: the Y is 9, the Y brightness values are 9 consecutive brightness values from 0 to 8, the Y long-exposure-pixel statistic numbers are 50, 158, 264, 750, 1281, 1830, 2562, 3128, and 3477 that are corresponding to the Y brightness values 0, 1, 2, 3, 4, 5, 6, 7, and 8 respectively, and the long-exposure dark-area total pixel number is 50+158+264+750+1281+1830+2562+3128+3477=13500.

S520: dividing the long-exposure dark-area total pixel number by the long-exposure total pixel number to obtain a dark-area ratio.

Referring to FIG. 2, in an exemplary implementation: the long-exposure dark-area total pixel number is 13500, the long-exposure total pixel number is 2073600 (i.e., 1920×1080=2073600), and the dark-area ratio is equal to $$\frac{13500}{2073600} = 0.65\%.$$

S530: when the dark-area ratio is greater than a predetermined dark-area ratio, increasing the exposure amount of the long-exposure setting and then making the long-exposure setting be applied to the generation/modification of the long-exposure image.

Referring to FIG. 2, in an exemplary implementation: the dark-area ratio is 0.65%, the predetermined dark-area ratio is 0.5%, and since 0.65% is greater than 0.5%, which implies that the long-exposure image is darker than what we expected, the step S530 increases the exposure amount of the long-exposure setting used for generating the long-exposure image and then makes the long-exposure setting be applied to the generation/modification of the long-exposure image. It is noted that the predetermined dark-area ratio can be determined according to implementation needs (e.g., according to scenes to be photographed).

It is noted that the long-exposure adjustment steps can optionally include: before calculating the long-exposure brightness mean value, making the dark-area ratio be equal to or smaller than the predetermined bright-area ratio through the adjustments in the exposure amount of the long-exposure setting.

Figure 6:
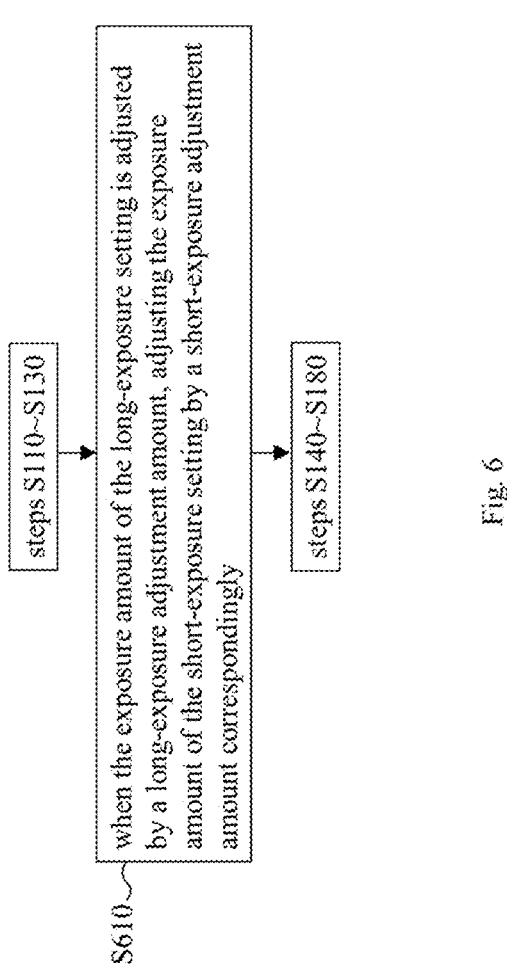
FIG. 6 shows yet another embodiment of the exposure control method of the present disclosure.

FIG. 6 shows another embodiment of the exposure control method of the present disclosure. In comparison with the embodiment of FIG. 1, the long-exposure adjustment steps of the embodiment of FIG. 6 further include:

S610: when the exposure amount of the long-exposure setting is adjusted by a long-exposure adjustment amount, adjusting the exposure amount of the short-exposure setting by a short-exposure adjustment amount correspondingly.

In an exemplary implementation: a ratio of the long-exposure adjustment amount to the short-exposure adjustment amount complies with a predetermined ratio; or an adjustment difference between the long-exposure adjustment amount and the short-exposure adjustment amount is less than a predetermined adjustment difference.

FIG. 7 shows another embodiment of the exposure control method of the present disclosure. In comparison with the embodiment of FIG. 1, the embodiment of FIG. 7 does not include the steps S110, S120, and S150 of FIG. 1. The embodiment of FIG. 7 includes the following steps:

S710: calculating a long-exposure brightness mean value of dark pixels of a long-exposure image, wherein all kind(s) of brightness values of the dark pixels is/are (N–X) brightness value(s) of N brightness values (e.g., 0~255) of the long-exposure image from a lowest brightness value (e.g., 0) of the N brightness values to an $(N–X)^{th}$ lowest brightness value (e.g., 9) of the N brightness values, a total number of bright pixels of the long-exposure image is a long-exposure bright-area total pixel number, all kind(s) of brightness values of the bright pixels is/are X brightness value(s) of the N brightness values from a highest brightness value (e.g., 255) of the N brightness values to an $X^{th}$ highest brightness value (e.g., 246) of the N brightness values, any two of the N brightness values are different, the N is an integer equal to or greater than five, and the X is a positive integer smaller than the N;

S720: when a long-exposure brightness-mean-value difference between the long-exposure brightness mean value and a long-exposure target brightness mean value is greater than a predetermined long-exposure brightness-mean-value difference, adjusting long-exposure setting that is for generating the long-exposure image and then making the long-exposure setting be applied to the generation/modification of the long-exposure image to prevent the long-exposure brightness-mean-value difference from being greater than the predetermined long-exposure brightness-mean-value difference;

S730: determining K pixels of a short-exposure image from the pixel(s) of the highest brightness value in top-down brightness order (e.g., all pixels of the brightness values 255~246), wherein the short-exposure image and the long-exposure image are two images of the same scene and have the same sizes, and an exposure amount of the long-exposure setting is more than an exposure amount of short-exposure setting that is for generating the short-exposure image, the K is a short-exposure bright-area total pixel number, and a number difference between the short-exposure bright-area total pixel number and the long-exposure bright-area total pixel number is not greater than a predetermined number difference;

S740: calculating a short-exposure brightness mean value of the K pixels; and

S750: when a short-exposure brightness-mean-value difference between the short-exposure brightness mean value and a short-exposure target brightness mean value is greater than a predetermined short-exposure brightness-mean-value difference, adjusting the short-exposure setting and then making the short-exposure setting be applied to the generation/modification of the short-exposure image to prevent the short-exposure brightness-mean-value difference from being greater than the predetermined short-exposure brightness-mean-value difference.

Since those having ordinary skill in the art can appreciate the detail and the modification of the embodiment of FIG. 7 by referring to the disclosure of the embodiments of FIGS. 1~6, which implies that some or all of the features of the embodiments of FIGS. 1~6 can be applied to the embodiment of FIG. 7 in a reasonable way, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible in accordance with the present disclosure.

To sum up, the exposure control method of the present disclosure can control the exposure setting for generating/modifying a long-exposure image and control the exposure setting for generating/modifying a short-exposure image in a simple and fast way.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

12

What is claimed is:

1. An exposure control method, the method comprising:
long-exposure adjustment steps including:

calculating a number of pixels of each brightness value of N brightness values of a long-exposure image to obtain N long-exposure-pixel statistic numbers, wherein the N long-exposure-pixel statistic numbers are corresponding to the N brightness values respectively, any two of the N brightness values are different, and the N is an integer equal to or greater than five;

adding up X long-exposure-pixel statistic number(s) of the N long-exposure-pixel statistic numbers to obtain a long-exposure bright-area total pixel number, wherein the X long-exposure-pixel statistic number(s) is/are respectively corresponding to X brightness value(s) of the N brightness values from a highest brightness value of the N brightness values to an $X^{th}$ highest brightness value of the N brightness values, and the X is a positive integer smaller than the N;

calculating a long-exposure brightness mean value of dark pixels of the long-exposure image, wherein all kind(s) of brightness values of the dark pixels is/are (N−X) brightness value(s) of the N brightness values from a lowest brightness value of the N brightness values to an $(N-X)^{th}$ lowest brightness value of the N brightness values; and when a long-exposure brightness-mean-value difference between the long-exposure brightness mean value and a long-exposure target brightness mean value is greater than a predetermined long-exposure brightness-mean-value difference, adjusting long-exposure setting that is used for generating the long-exposure image and then making the long-exposure setting be applied to generation/modification of the long-exposure image to prevent the long-exposure brightness-mean-value difference from being greater than the predetermined long-exposure brightness-mean-value difference; and short-exposure adjustment steps including:

determining a number of pixels of each brightness value of plural brightness values of the N brightness values of a short-exposure image to obtain plural short-exposure-pixel statistic numbers, wherein the plural short-exposure-pixel statistic numbers are corresponding to the plural brightness values respectively, the short-exposure image and the long-exposure image are two images of a same scene and have same sizes, and an exposure amount of the long-exposure setting is more than an exposure amount of short-exposure setting that is used for generating the short-exposure image;

determining K pixels of the short-exposure image from pixel(s) of the highest brightness value in top-down brightness order, wherein the K is a short-exposure bright-area total pixel number, and a number difference between the short-exposure bright-area total pixel number and the long-exposure bright-area total pixel number is not greater than a predetermined number difference;

calculating a short-exposure brightness mean value of the K pixels; and when a short-exposure brightness-mean-value difference between the short-exposure brightness mean value and a short-exposure target brightness mean value is greater than a predetermined short-exposure brightness-mean-value difference, adjusting the short-exposure setting and then making the short-exposure setting be applied to generation/modification of the short-exposure image to prevent the short-exposure brightness-mean-value difference from being greater than the predetermined short-exposure brightness-mean-value difference.

2. The method of claim 1, wherein the short-exposure bright-area total pixel number is set to be equal to the long-exposure bright-area total pixel number.

3. The method of claim 1, wherein a sum of the N long-exposure-pixel statistic numbers is a long-exposure total pixel number, and the long-exposure adjustment steps further include:

dividing the long-exposure bright-area total pixel number by the long-exposure total pixel number to obtain a bright-area ratio; and when the bright-area ratio is greater than a predetermined bright-area ratio, decreasing the exposure amount of the long-exposure setting.

4. The method of claim 3, wherein the long-exposure adjustment steps further include: before calculating the long-exposure brightness mean value, making the bright-area ratio be equal to or smaller than the predetermined bright-area ratio.

5. The method of claim 1, wherein a sum of the N long-exposure-pixel statistic numbers is a long-exposure total pixel number, and the long-exposure adjustment steps further include:

adding up Y long-exposure-pixel statistic number(s) of the N long-exposure-pixel statistic numbers to obtain a long-exposure dark-area total pixel number, wherein the Y long-exposure-pixel statistic number(s) is/are respectively corresponding to Y brightness value(s) of the N brightness values from the lowest brightness value of the N brightness values to a $Y^{th}$ lowest brightness value of the N brightness values, and the Y is a positive integer smaller than the N;

dividing the long-exposure dark-area total pixel number by the long-exposure total pixel number to obtain a dark-area ratio; and when the dark-area ratio is greater than a predetermined dark-area ratio, increasing the exposure amount of the long-exposure setting.

6. The method of claim 5, wherein the long-exposure adjustment steps further include: before calculating the long-exposure brightness mean value, making the dark-area ratio be equal to or smaller than the predetermined dark-area ratio.

7. The method of claim 1, wherein the (N–X) brightness value(s) is/are corresponding to (N–X) long-exposure-pixel statistic number(s) of the N long-exposure-pixel statistic numbers respectively, and the step of calculating the long-exposure brightness mean value includes:

multiplying the (N–X) brightness value(s) by the (N–X) long-exposure-pixel statistic number(s) respectively and then adding up all products to obtain a total product; and then dividing the total product by a sum of the (N–X) long-exposure-pixel statistic number(s) to obtain the long-exposure brightness mean value.

8. The method of claim 1, wherein the long-exposure adjustment steps further include: when the exposure amount of the long-exposure setting is adjusted, adjusting the exposure amount of the short-exposure setting correspondingly.

9. The method of claim 8, wherein the long-exposure adjustment steps further include:

the exposure amount of the long-exposure setting is adjusted by a long-exposure adjustment amount, and the exposure amount of the short-exposure setting is adjusted by a short-exposure adjustment amount; and a ratio of the long-exposure adjustment amount to the short-exposure adjustment amount complies with a predetermined ratio, or an adjustment difference between the long-exposure adjustment amount and the short-exposure adjustment amount is less than a predetermined adjustment difference.

10. The method of claim 1, wherein all kinds of brightness values of the K pixels are M brightness values of the N brightness values from the highest brightness value of the N brightness values to an $M^{th}$ highest brightness value of the N brightness values, (M–1) brightness value(s) of the M brightness values from the highest brightness value of the N brightness values to an $(M–1)^{th}$ brightness value of the N brightness values is/are corresponding to (M–1) short-exposure-pixel statistic number(s) of the plural short-exposure-pixel statistic numbers respectively, a lowest brightness value of the M brightness values is corresponding to a calculation statistic number which is equal to a result of subtracting a sum of the (M–1) short-exposure-pixel statistic numbers from the K, the M is an integer greater than one and smaller than the N, and the step of calculating the short-exposure brightness mean value includes:

multiplying the (M–1) brightness values by the (M–1) short-exposure-pixel statistic numbers respectively and then adding up all products to obtain a first product; multiplying the lowest brightness value of the M brightness values by the calculation statistic number to obtain a second product; and dividing a sum of the first product and the second product by the K to obtain the short-exposure brightness mean value.

11. An exposure control method, the method comprising: long-exposure adjustment steps including:

calculating a long-exposure brightness mean value of dark pixels of a long-exposure image, wherein all kind(s) of brightness values of the dark pixels is/are (N–X) brightness value(s) of N brightness values of the long-exposure image from a lowest brightness value of the N brightness values to an $(N–X)^{th}$ lowest brightness value of the N brightness values, wherein a total number of bright pixels of the long-exposure image is a long-exposure bright-area total pixel number, all kind(s) of brightness values of the bright pixels is/are X brightness value(s) of the N brightness values from a highest brightness value of the N brightness values to an $X^{th}$ highest brightness value of the N brightness values, any two of the N brightness values are different, the N is an integer equal to or greater than five, and the X is a positive integer smaller than the N; and when a long-exposure brightness-mean-value difference between the long-exposure brightness mean value and a long-exposure target brightness mean value is greater than a predetermined long-exposure brightness-mean-value difference, adjusting long-exposure setting that is used for generating the long-exposure image and then making the long-exposure setting be applied to generation/modification of the long-exposure image to prevent the long-exposure brightness-mean-value difference from being greater than the predetermined long-exposure brightness-mean-value difference; and short-exposure adjustment steps including:

determining K pixels of a short-exposure image from pixel(s) of the highest brightness value in top-down brightness order, wherein the short-exposure image and the long-exposure image are two images of a same scene and have same sizes, and an exposure amount of the long-exposure setting is more than an exposure amount of short-exposure setting that is used for generating the short-exposure image, the K is a short-exposure bright-area total pixel number, and a number difference between the short-exposure bright-area total pixel number and the long-exposure bright-area total pixel number is not greater than a predetermined number difference;

calculating a short-exposure brightness mean value of the K pixels; and when a short-exposure brightness-mean-value difference between the short-exposure brightness mean value and a short-exposure target brightness mean value is greater than a predetermined short-exposure brightness-mean-value difference, adjusting the short-exposure setting and then making the short-exposure setting be applied to generation/modification of the short-exposure image to prevent the short-exposure brightness-mean-value difference from being greater than the predetermined short-exposure brightness-mean-value difference.

12. The method of claim 11, wherein the long-exposure adjustment steps further include:

when the exposure amount of the long-exposure setting is adjusted by a long-exposure adjustment amount, adjusting the exposure amount of the short-exposure setting by a short-exposure adjustment amount correspondingly, wherein a ratio of the long-exposure adjustment amount to the short-exposure adjustment amount complies with a predetermined ratio, or an adjustment difference between the long-exposure adjustment amount and the short-exposure adjustment amount is less than a predetermined adjustment difference.

* * * * *